United States Patent [19]

Stewart

[11] Patent Number: 4,744,248
[45] Date of Patent: May 17, 1988

[54] VIBRATING ACCELEROMETER-MULTISENSOR

[75] Inventor: Robert E. Stewart, Woodland Hills, Calif.

[73] Assignee: Litton Systems, Inc., Beverly Hills, Calif.

[21] Appl. No.: 66,834

[22] Filed: Jun. 25, 1987

Related U.S. Application Data

[60] Division of Ser. No. 884,115, Jul. 10, 1986, which is a continuation-in-part of Ser. No. 770,882, Aug. 29, 1985, abandoned, which is a continuation of Ser. No. 558,055, Dec. 5, 1983, abandoned, and a continuation-in-part of Ser. No. 573,017, Jan. 23, 1984, and a continuation-in-part of Ser. No. 758,692, Jul. 25, 1985, Pat. No. 4,679,434.

[51] Int. Cl.$^4$ .................. G01P 9/04; G01P 15/13
[52] U.S. Cl. .................................. 73/505; 73/510
[58] Field of Search ............ 73/505, 510, 517 R, 73/517 B, 516 R

[56] References Cited

U.S. PATENT DOCUMENTS

| | | | |
|---|---|---|---|
| 2,544,646 | 3/1951 | Barnaby et al. | 73/505 |
| 4,510,802 | 4/1985 | Peters | 73/505 |
| 4,590,801 | 5/1986 | Merhav | 73/510 |

Primary Examiner—John Chapman
Attorney, Agent, or Firm—Roy L. Brown; Elliott Kramsky

[57] ABSTRACT

A vibrating multisensor, each using two accelerometers which are vibrated along straight lines perpendicular to their sensing axes. The sensing axes are co-linear, the accelerometers are vibrated in phase opposition along parallel axes. The accelerometers preferably use a proof mass and flexure suspension made on a silicon wafer sandwiched between two other wafers that carry electrodes both for sensing displacement and forcing of the central accelerometer wafer.

22 Claims, 8 Drawing Sheets

VIBRATING ACCELEROMETER-MULTISENSOR

RELATED PATENT APPLICATIONS

This is a division of application Ser. No. 884,115, filed July 10, 1986, which is a continuation-in-part of Ser. No. 770,882, filed Aug. 29, 1985 abandoned, which is a continuation of Ser. No. 558,055 filed Dec. 5, 1983, for TWO AXES MULTISENSOR, abandoned, and a continuation-in-part of Ser. No. 573,017, filed Jan. 23, 1984 for SINGLE AXIS MULTISENSOR, and a continuation-in-part of Ser. No. 758,692, filed July 25, 1985 for INTEGRATED FORCE BALANCED ACCELEROMETER now Pat. No. 4,679,434 which issued July 14, 1987.

FIELD OF THE INVENTION

The present invention relates to an inertial instrument. More particularly, this invention pertains to both single- axis and multi-axes vibrating accelerometers used as multisensors for measuring both the linear acceleration and rate of rotation of a moving body.

The present invention also relates more particularly to both such single-axis and two-axes vibrating integrated and force balanced accelerometers of the closed loop type measuring both the linear acceleration and the rate of rotation of a moving body. More particularly, this invention pertains to a package of such integrated accelerometers which are formed within a semiconductor substrate that includes associated servo and signal processing electronics also formed within a common substrate.

DESCRIPTION OF THE PRIOR ART

A number of attempts have been made to utilize an inertial sensing mass member to detect the rate of rotation of a body. Generally, such attempts have been based upon the Coriolis acceleration experienced by a vibrating or rotating body fixed to a second body whose rotation is to be sensed. Coriolis acceleration is described by the following equation:

$$\overline{A} = 2\overline{\Omega} \times \overline{v}$$

where:
$\overline{A}$ = Coriolis acceleration;
$\overline{\Omega}$ = angular rate of rotating coordinate system (second body) to be measured; and
$\overline{v}$ = velocity component perpendicular to the axis of rotation.

The foregoing equations express the basic principles on which all vibratory gyros as well as spinning wheel gyros are based; namely, a Coriolis acceleration force is experienced when a moving mass has a velocity component perpendicular to the axis of rotation of an associated rotating coordinate system. Leon Foucault, in the early 1850's, showed that these principles allow the sensing of angular rates with an oscillating pendulum. More recently attempts have been made to use Coriolis acceleration principles to design rate and rate integrating gyros.

Prominent among the attempts to develop a rate sensing gyro according to the foregoing principles are the following inertial sensors (all referred to by trademark name): "Gyrotron" by the Sperry Gyroscope Corporation (1940); "A5 Gyro" by the Royal Aircraft Establishment; "Vibrating String Gyro" by the North American Rockwell Corporation (Autonetics Division, Anaheim, Calif.); "Viro" by the General Electric Corporation and "Sonic Bell Gyro" by the General Motors Corporation (Delco Division). All of the above, except the Gyrotron, began development in the 1960's or earlier.

The above-named systems rely upon a vibrating body to supply a velocity component which is perpendicular to the axis of rotation of a second body. The alternating Coriolis acceleration, $\overline{A}$, experienced by such vibrating body is then measured. For a constant vibration velocity amplitude, $\overline{v}$ of the force-sensing element, the Coriolis acceleration is proportional to the angular rotation rate, A.

Vibrating bodies are mechanically simpler than rotating assemblages. To arrange a rotatable inertial instrument, such as an accelerometer, which is sensitive to Coriolis acceleration, ball bearings, slip rings, spin motors and the like must be used. Further, to resolve the input angular rate of a rotatable instrument into orthogonal sensitive axes, the phase of the instrument output signal must be referenced in phase with the case within which it is mounted which is more complicated than a vibrating instrument.

Typical prior-art attempts to measure rotation rate using a vibrating inertial sensor have used an openloop vibrating mechanical systems in which the displacement of an unconstrained vibrating inertial mass member, upon experiencing Coriolis acceleration, generates an electrical signal proportional to the Coriolis force. Such systems are tuning forks wherein the tines vibrate or vibrating strings which vibrate at a frequency, f, and the tines or string are deflected in a direction perpendicular to the plane of vibration by an amount proportional to the Coriolis acceleration, $\overline{A}$. A vibrating open loop system, while mechanically less complex than a rotating system, is inaccurate because of the orthogonal movements required of open loop force detecting mechanisms.

A potential problem inherent in any multisensor comprised of one or more vibrated sensors of the inertial mass type occurs when linear acceleration information along the input or sensing axis of the sensor(s) is included in the sensor's output signal. While, frequently the frequency band of expected acceleration is predictable and lies outside the bandwidth of concern, confusion arises when the frequency of linear acceleration along the input or sensing axis is near the frequency of vibration of the sensor.

The integration of sensors and associated signal processing circuitry on a single silicon chip began with pressure transducers about ten years ago. Intensive efforts are currently underway at several universities and industrial research laboratories to extend this technology to many applications including accelerometers.

Prior art accelerometers of the open loop type have been built and tested. Typical of such prior art open loop designs are those that include a cantilevered beam constructed from a semiconductor substrate that has an inertial mass member attached to its free end. Typically, disposed on opposite sides of such a cantilevered structure are piezo-resistive sensing elements. The electrical resistances of such sensing elements vary as the mass member moves in response to acceleration forces, stressing the cantilevered beam. Such prior art open loop accelerometers are usually hampered by poor null stability, high hysteresis and excessive temperature sensitivity.

SUMMARY OF THE INVENTION

The preceding and other problems of the prior art are addressed and solved by the present invention which provides an improved multisensor. One embodiment of the multisensor includes first and second acceleration sensing apparatus responsive to acceleration along first and second axes, respectively, and apparatus for mounting such acceleration sensing apparatus to make the first and second axes parallel. Means for mechanically vibrating the acceleration sensing apparatus, in opposite phase, along parallel axes which are each perpendicular to the first and second axes. The first and second axes, to avoid the effects of angular vibration, preferably have an average position which is coaxial.

A second embodiment of the invention includes first and second acceleration sensors responsive to linear acceleration along first and second axes, including means to position such axes perpendicular to each other. Means are further provided for vibrating both sensors along parallel axes in a third direction perpendicular to the plane of the first and second axes. Apparatus, usually electronic, is used to receive the output signals of the sensors and to extract signals therefrom which are measures of the Coriolis acceleration forces exerted upon the sensors.

In a further aspect, the present invention provides a method for sensing both the linear acceleration and the rate of rotation of a body. One method includes the step of providing first and second constrained mass inertial sensors responsive to linear acceleration and arranging such sensors so that each is responsive to linear acceleration forces experienced by said body along orthogonal axes. The sensors are then vibrated at a preselected frequency, and signals that are measures of the linear and Coriolis accelerations exerted upon the sensors are extracted from their output signals.

The present invention extends the above concepts to the use of closed loop, force balanced accelerometers, preferably produced by batch processing of silicon wafers in much the same way an integrated circuit is produced, as acceleration sensors therein.

The preferred accelerometer used in the present invention includes a critical central inertial mass member constructed from a semi-conductor substrate, such as silicon, which may be doped to produce conductive members where needed. The inertial mass member is attached, in a cantilevered configuration, to the substrate by hinges which are formed by anisotropic etching of a single crystal silicon.

The cantilevered connection of the mass member to the substrate preferably is by hinges formed from crossed beam flexure blades. The blades are typically formed by etching a first set of V-shaped grooves into opposite surfaces of a semiconductor substrate, leaving a thin, angled blade of silicon for a hinge to join the inertial mass member to the substrate. A second cross beam flexure blade is typically formed by etching a second set of grooves, similar to the first set of grooves but offset from the first set of grooves by approximately one-half a groove width. The second set of grooves is reversed relative to the first set of grooves. The resulting inclined, thin flexure blade is thus oriented at an opposite inclination to its counterpart. Because of the offset and reversal, the two flexured blades cross at their midsections to provide high rotational compliance about an axis parallel to the plane of the silicon substrate while providing high stiffness for rotation about or translation in the directions of other axes.

A closed loop accelerometer amenable to fabrication by well-known semiconductor fabricating technologies including, for example, photolithographic and anisotropic etching, offers many advantages including tight tolerance control and the ability to integrate all or part of the accelerometer electronics into a single common substrate of relatively minute size. Further, microcomputer control can be employed in such an accelerometer, permitting it to be custom designed and calibrated for a specific use.

The invention will become further apparent from the following detailed description. This description is accompanied by a set of drawing figures including a reference set of numerals, like numerals of the figures corresponding to like figures of the written description and like features of the invention throughout.

DETAILED DESCRIPTION OF THE INVENTION

Figure 1:
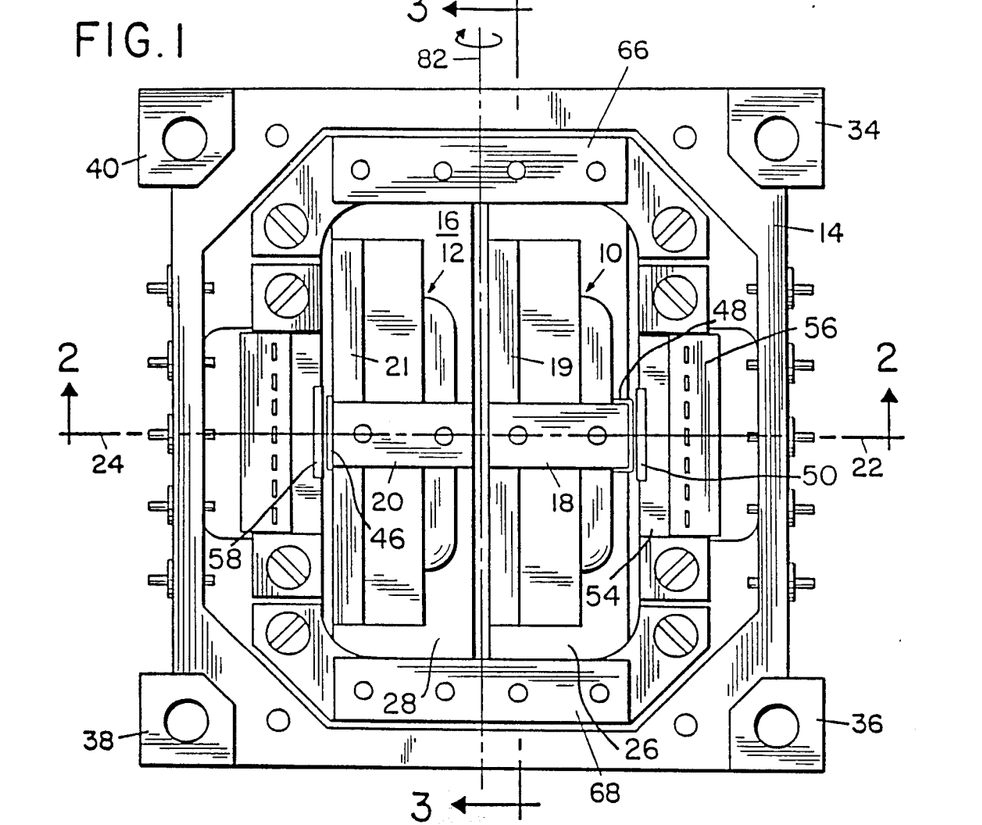
FIG. 1 is a top view of a single axis multisensor with certain portions removed for clarity.

In the drawings, FIG. 1 presents a top view of a first embodiment of a multisensor according to the present invention. To enchance explanation, the top of the outer case 14 is removed, and a number of features of the embodiment are not shown in that figure.

The accelerometers are preferably of a force balance type in which an inertial mass member is positioned and suspended to react to and to provide a signal that is a measure of acceleration of the supporting structure along a predetermined axis.

Although such force balance accelerometers with a constrained sensing mass member are preferred, accelerometers of the open loop type or a combination of open and closed loop type sensors may be employed. Further, the invention may be practiced by other accelerometers which include elements whose optical properties are altered during acceleration.

In the first embodiment, the accelerometers are positioned within a cavity 16 within the case 14. Accelerometer 10 is attached to a three-part bracket assembly that includes the finger 18 and the beam 19. Accelerometer 12 is attached to a three-part bracket assembly that includes finger 20 and beam 21. To permit a clear view of each accelerometer and bracket assembly, sidebeams are omitted in FIG. 1. However, as shown in FIGS. 2 and 3, each combined bracket-and-accelerometer assembly is sandwiched between a pair of spaced-apart flexible sidebeams that include piezoelectric elements bonded thereto for effecting predetermined vibratory sensor motion.

Figure 2:
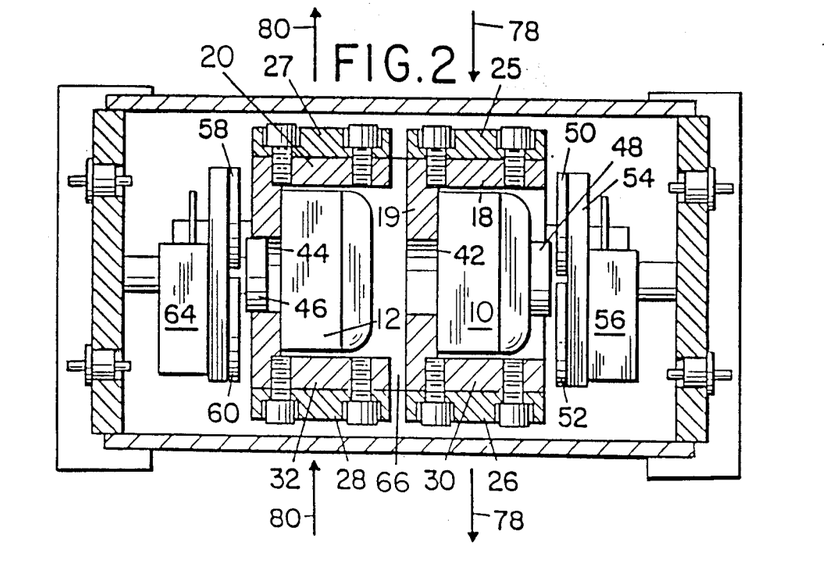
FIG. 2 is, in part, a cross section of a single axis multisensor taken along section line 2—2 of FIG. 1 and additionally including certain of the components thereof that were omitted from the prior Figure.
Figure 3:
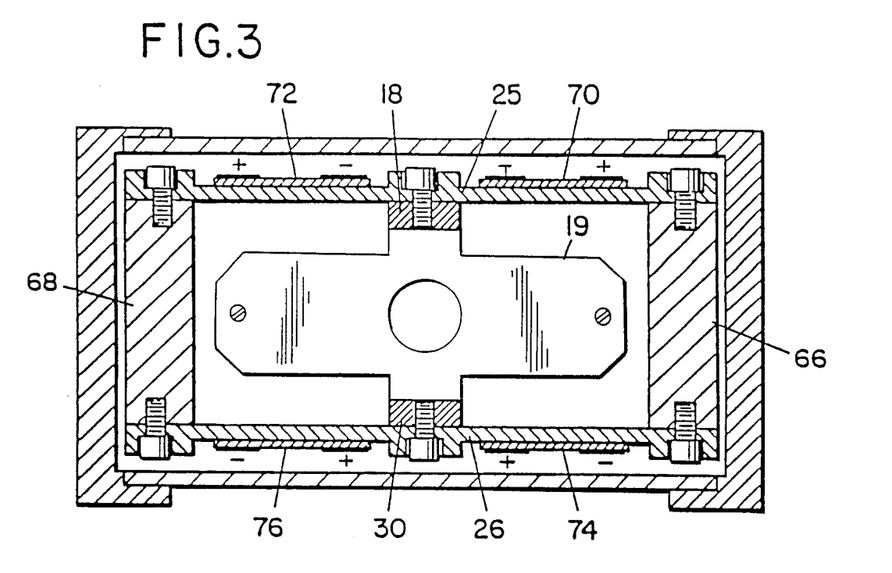
FIG. 3 is an enlarged partial cross section taken along the line 3—3 of FIG. 1 to illustrate the vibration according to a first embodiment of this invention wherein two accelerometers have sensing axes which are substantially parallel.

The accelerometers 10 and 12 are positioned, as shown in FIG. 2, within the cavity 16 so that their input axes, 22 and 24, respectively, are parallel with their mean or average position during vibration substantially collinear. FIG. 2 is a view, partly in section, taken at 2—2 of FIG. 1, and it includes some elements not shown in FIG. 1. In FIG. 2 the right and left parallel beam suspensions comprising spaced apart sidebeams in pairs, 25, 26, and 27, 28, respectively sandwich the right and left accelerometer-and-bracket assemblies. Note that the right bracket assembly is completed by a lower finger 30, and the left bracket assembly is completed by a lower finger 32.

The mass members of the right and left assemblies of accelerometers, brackets and sidebeam pairs are substantially indentical to reduce loads at the case mounts 34, 36, 38 and 40. Making the masses indentical tends, to a first order, to compensate for linear (pure translation) vibration. Holes 42 and 44, formed in the beams 19 and 21, are substantially identical. The hole 42 is used only to equalize or balance the masses, but the hole 44 encloses a magnet 46 that is substantially identical to the magnet 48 on the accelerometer 10.

Each of the magnets 46 and 48 interacts with a case-fixed pair of coils that, taken together, act as a velocity pickoff. Vibration of the magnet 48 and accelerometer 10 induces voltage in velocity pickoff coils 50 and 52. Coils 50, 52 are secured to a case-fixed bracket 54. The bracket 54 also carries an accelerometer restoring amplifier 56. Vibration of accelerometer 12 and magnet 46 induces voltage in velocity pickoff coils 58 and 60. The accelerometer restoring amplifier 64 and the coils 58, 60 are secured to the case-fixed bracket 62.

In FIGS. 1-3, to vibrate accelerometers 10 and 12, the accelerometer 10 is held between sidewalls 25 and 26 by the spaced apart fingers 18 and 30. The sidebeams 25 and 26 extend the length of the cavity 16, and they are attached to the opposed beam support flexures 66 and 68. The side beams are each of, W-shaped cross-section, outwardly-facing reinforced portions that are integral with thin, web-like members.

Figure 4:
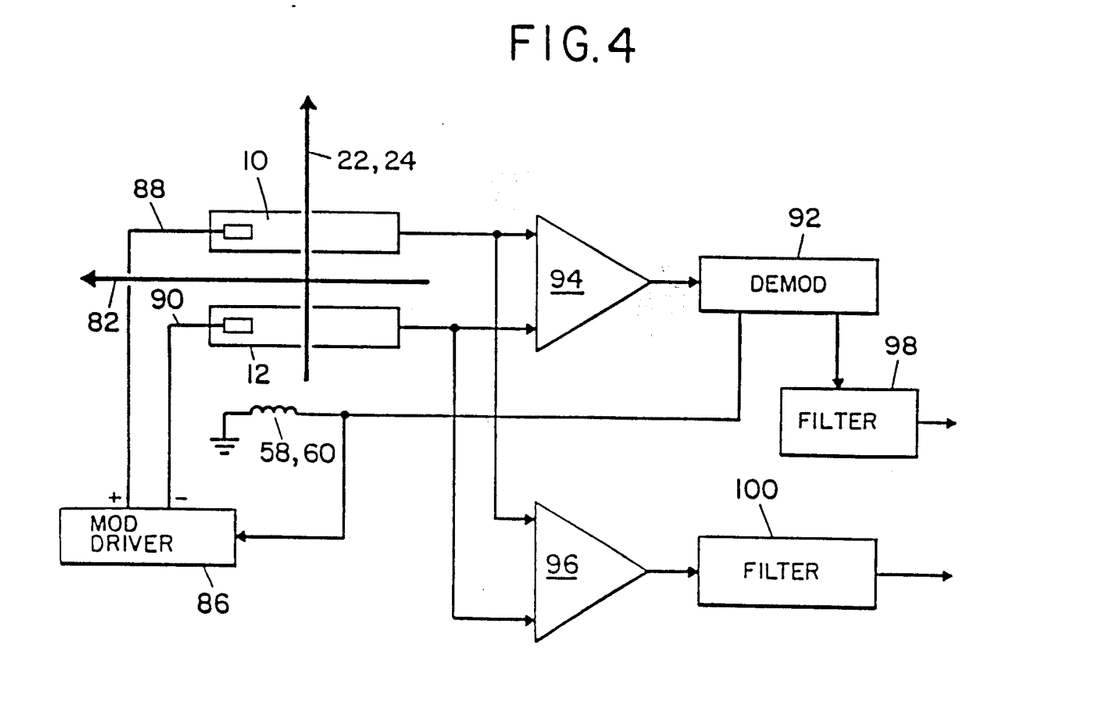
FIG. 4 is a functional block diagram of rate and acceleration extraction circuitry for use in the embodiment of FIGS. 1-3.

Piezoelectric vibration elements 70, 72, 74, 76 are bonded to the web-like portions of the side beams by adhesives such as epoxy or the like. Metallized contacts are plated in pairs to the piezoelectric elements. Piezoelectric material is deformed predictably and reproducibly in response to positive and negative voltages. For example, by delivering negative and positive voltages to polarized piezoelectric elements shown in FIG. 3, upward forces are delivered to each side beam at its midpoint. By reversing the signs of the voltages, the combinations of sidewalls, brackets and accelerometers are forced downward. Thus, by sequencing the polarities of the electrical voltages, the accelerometer 10 and the accelerometer 12 are substantially sinusoidally vibrated in phase opposition at a preselected frequency, preferably the mechanically resonant frequency of the vibrating structure. The amplitude of the sinusoidal velocity of vibration is held constant by the mod driver 86 (FIG. 4). The vibration is at the resonant frequency to minimize the use of power in vibrating the accelerometers. However, the resonant frequency may drift with temperature, and the like. To hold the calibrated relation between the sensed Coriolis acceleration and the angular velocity to be measured, the velocity amplitude of the vibration is servoed through the mod driver 86 to a constant amplitude.

The vibrations of the accelerometers 10 and 12 are, with a 180 degree phase difference, along the parallel axes 78 and 80 which are perpendicular to the sensing axes 22, 24. Because Coriolis accelerations appear in a vibrating system, vibrating the accelerometers 10 and 12 along the indicated axes 78, 80 produces measurable acceleration signals proportional to the component of the rate of rotation of the multisensor apparatus of the invention along the input axis of each accelerometer. Thus, the output signals of the accelerometers 10 and 12 contain measures of the rate of rotation of the system about axis 82 of FIG. 1.

FIG. 4 is a block diagram of an electrical circuit to extract two signals of linear acceleration of the supporting vehicle in the direction of and along the input axes 22, 24 of the accelerometers 10 and 12 and rotation about axis 82.

The vibration driving signals are delivered along conductors 88 and 90 from a driver circuit 86 to the piezoelectric elements on the accelerometers 10 and 12. Voltages induced in the right and left pickoff coil pairs, 58, 60 actuate the driver 86 in a self-resonant circuit arrangement. For example, the sensed vibration of the accelerometer 12 is converted into a corresponding sinusoidal voltage proportional to velocity by interaction of the magnet 46 with left pickoff coils 58, 60. That voltage is delivered to the driver circuit 86. The signal induced in the pickoff coils serves as an input to the mod driver 86 and is a demodulation reference signal for a demodulator 92. The Coriolis acceleration signal, cross product, is oscillatory with frequency equal to that of the frequency of vibration of the sensing accelerometer and amplitude proportional to the input angular rate about axis 82. Demodulation of a sinusoidal Coriolis signal produces or extracts a signal that is a measure of angular rate or velocity.

The outputs of the right and left accelerometers 10 and 12 are fed, in parallel, to both a differential amplifier 92 and a summing amplifier 96. Because the accelerometers are vibrated 180 degrees out-of-phase, the component portions of their signal outputs that measure Coriolis acceleration are of opposite sign while the portions that measure linear acceleration are of like sign. Therefore, the output of the differential amplifier 94, a measure of the difference between the accelerometer outputs, is solely a measure of Coriolis acceleration, and the portions of the outputs responsive to linear acceleration are cancelled in that amplifier. As a further consequence of the equal and opposite senses of the Coriolis or rate components of the sensor outputs, the output of the differential amplifier 94 provides twice as sensitive a measure of rotation as the output of a multisensor using a single accelerometer.

The rate output of amplifier 94 is delivered to the demodulator 92 which, as discussed above, uses the sinusoidal voltage of the velocity pickoff coils as its demodulation reference. The demodulated rate output is then delivered from demodulator 92 to a filter 98 for final extraction of the rate signal.

Further, because of the opposite senses of the Coriolis components of the outputs of the right and left accelerometers 10 and 12, the output of the summing amplifier 96, to which the accelerometer outputs are applied, contains no angular rate information, and it is twice as sensitive a measure of linear acceleration in the direction of the coincident accelerometer input axes 22, 24 as the output of a single one of the accelerometers 10 or 12. The output signal of the amplifier 96 need not be demodulated (unlike the rate signal) because it is a direct measure of acceleration, whether or not such acceleration is vibratory in nature. The signal of amplifier 96 is delivered to filter 100 to extract acceleration signals.

Thus, the first embodiment is an improved multisensor of the vibratory type that achieves enhanced sensitivity to both acceleration and rotation, and it is not susceptible to errors that might otherwise be induced when the frequency of linear acceleration coincides with or is very close to the modulated frequency of the vibrated sensor.

Figure 5:
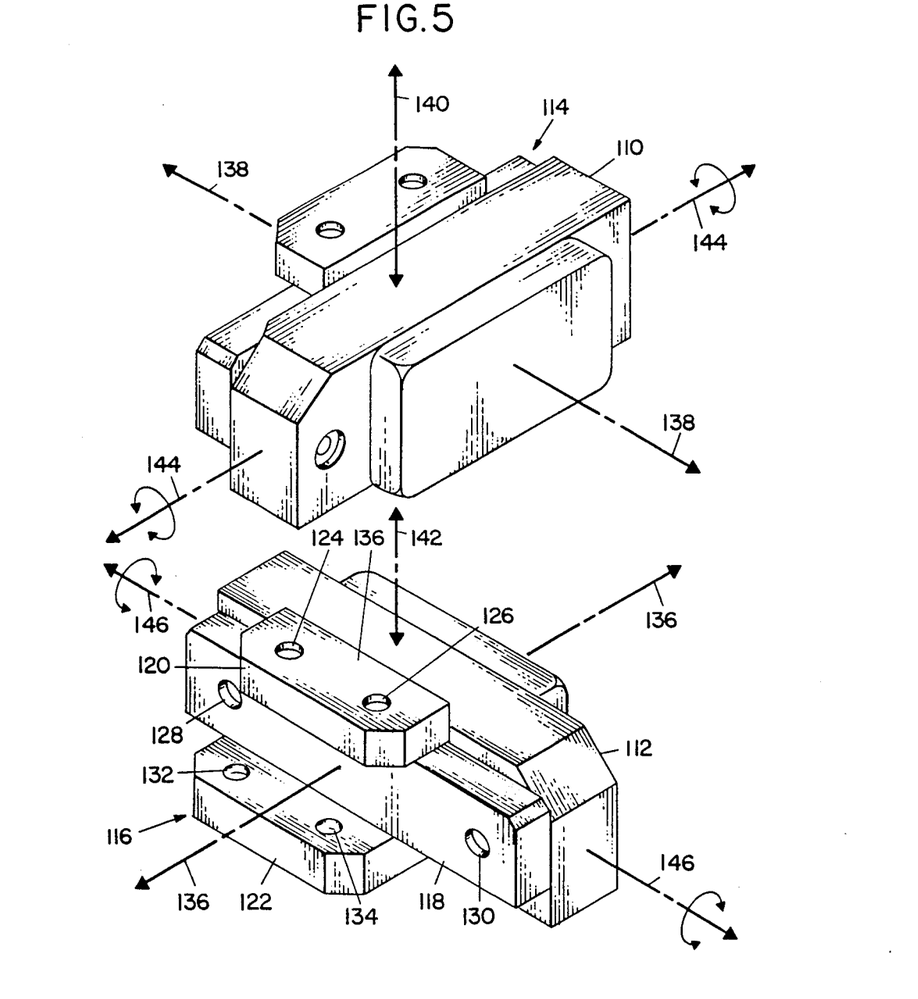
FIG. 5 is a partial view, in exploded perspective, to illustrate the relative positions of accelerometers according to a second embodiment of the invention.

FIG. 5 is an exploded perspective view of the invention, showing a second embodiment of preferred relative orientations of the accelerometers of the multisensor. The acceleration sensing means comprises an orthogonal arrangement of two accelerometers 110 and 112. Each accelerometer is preferably of the force balance type in which a pendulous mass member is oriented to react to an acceleration acting along its input axis. Unlike an open loop type of force detection mechanism, such mass member is constrained by the action of restoring forces to avoid a measurable displacement. The force caused by acceleration acting on the sensing mass member is a measurable and known function of the energy required to enable the accelerometer forcers to maintain the null position of the sensing mass member relative to its frame as it experiences acceleration. The pickoff sensors of the accelerometers, which may be a number of conventional electro-mechanical transducers, cause forcing amplifiers to produce electrical signals proportional to the restoring force. The needed restoring force is servoed to maintain the pickoff sensors nulled and is proportional to the acceleration action on the sensing mass member within the accelerometer.

While a wide range of acceleration-sensing instruments may be used and function within the apparatus of the invention, the apparatus illustrated in FIG. 5 is shown with two A4 MOD IV accelerometers of the pendulous, force balance type. The A4 accelerometer is available from Litton System, Inc. of Beverly Hills, Calif. Each of the upper and lower acclerometers 110 and 112 is attached to a corresponding upper or lower bracket 114, 116 comprising, for example, a central backing member 118 sandwiched between two transversely-oriented flanges 120 and 122. The height of each overall bracket structure exceeds that of the accelerometer fixed to it, and each bracket is mounted to extend both below and above such accelerometer. The accelerometers are suspended within the case of the multisensor to minimize any deleterious mechanical feedback between the acccelerometer and case. Holes 124, 126, 128, 130, 132 and 134 are in the bracket assembly to receive bolts (not shown) to secure the bracket to the accelerometer and to an armature or diaphragn, disclosed in FIG. 6.

Figure 6:
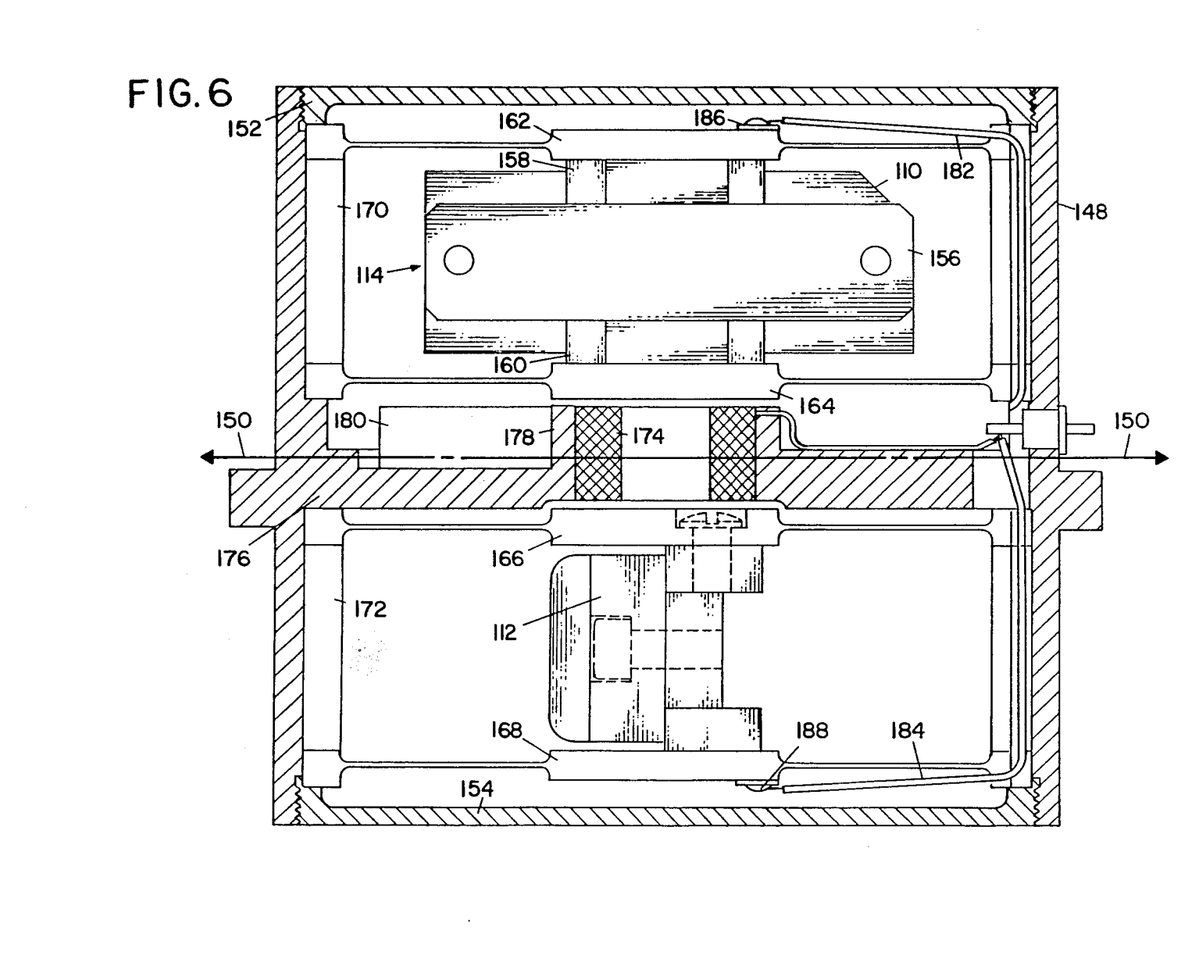
FIG. 6 is a side sectional view of a multisensor according to the second embodiment of the invention.

The conventional inner workings of the accelerometers 110 and 112 are not shown in FIGS. 5 and 6. Input axes 136 and 138 define the directions of sensitivity to acceleration. Double headed arrows 140 and 142 indicate the collinear directions of vibration of the accelerometers while rotation of the body, to which the multisensor case is fixed, is measured about the rotation-sensitive axes 144 and 146.

Referring to the equation for Coriolis acceleration, above, the multisensor according to the second embodiment delivers a predetermined vibratory velocity, frequency and amplitude along collinear axes 140 and 142 to accelerometers 110 and 112, to sense Coriolis acceleration, A, along input axes 136 and 138 which are functionally related to rotation about perpendicular accelerometer axes 144 and 146. Additionally, the multisensor system detects non-Coriolis-induced linear acceleration along the input axes 136 and 138. Such linear accelerations are distinguished from the angular-rate-measuring Coriolis forces by selection of the frequency of vibration of the accelerometers and with the demodulation and filtering apparatus of FIG. 4.

FIG. 6 shows a cross-section of a typical cylindrical outer case 148 and an assembly of FIG. 5. The accelerometers within the cylindrical case 148 are ortho-symmetrical about a horizontal axis 150; that is, corresponding elements of the instrument above the axis 150 are rotated by ninety degrees from those below the axis.

Covers 152 and 154 seal the multisensor. The bracket 114, shown in FIG. 6, secures the upper accelerometer 110. It includes a central backing member 156 joined to transversely-oriented flanges 158 and 160.

Each accelerometer-and-bracket assembly is bolted at the top and bottom to a substantially disc-shaped diaphragm or armature having a reinforced center and edge portions separated by a relatively thin annular diaphragm. The diaphragms form independent double diaphragm suspensions both above and below the horizontal axis 150. Armatures or diaphragms 162 and 164 are bolted to, and are the sole support of, the upper bracket-and-accelerometer assembly, and armatures or diaphragms 166 and 168 are the sole support of the lower bracket-and-accelerometer assembly.

Cylindrical spacers 170 and 172 separate the edges of the armatures or diaphragms to form a pair of independent vibratory units within the case 148. The upper vibratory unit comprises upper accelerometer 110 and bracket assembly sandwiched between the armatures or diaphragms 162 and 164 and surrounded by the cylindrical spacer 170. The lower vibratory unit comprises lower accelerometer 112 and bracket assembly sandwiched between the armatures or diaphragms 166 and 168 and surrounded by the cylindrical spacer 172.

An electromagnet 174 is positioned in the center of the case 48 by an inwardly-extending radial flange 176 and cup 178. A conventional acceleration-restoring amplifier 180, mounted on the flange 176, receives pickoff signals generated by the accelerometers and, in response, delivers control signals to the mass member-restoring forcers of the accelerometers. The conductors for the accelerometer are omitted for clarity in FIG. 6. Electrical communication is exterior to the multisensor through upper and lower conductors 182 and 184 which connect to the sensing apparatus of the upper and lower accelerometers 110 and 112, respectively, through soldered contact pads 186 and 188. Each conductor includes six individual conductors; one pair of conductors is connected, for example, to excite light emitting diodes on a pickoff sensor; another pair is connected to the output of the photodiode portion of the pickoff; and a third pair delivers current to the accelerometer forcer mechanism.

The electromagnet 174 drives the upper and lower double-diaphragm vibratory units defined above by activating and deactivating electromagnetic fields which alternately attract and release the diaphragms 164 and 166. Because of the driving of the diaphragms, the vibratory unit, including associated accelerometers, are oscillated in the vertical plane. Further, the electromagnet 174, positioned between the diaphragms 164 and 166 the two units, and associated accelerometers, vibrate out of phase by 180 degrees. By vibrating out of phase, the units, each having identical resonant frequencies, exert equal and opposite vibrational forces thereby minimizing the vibrational energy coupled to the case 148 to avoid mounting sensitivities.

The output signal of each accelerometer is a signal containing both rate and linear acceleration information measured along its respective input axis. The extraction of separate Coriolis and linear acceleration signals by demodulating the output signals of the accelerometers, and the automatic calculating of the angular velocity from the Coriolis signal was described above in connection with FIG. 4. Particularly, the output rate information component is modulated at the preselected frequency of accelerometer vibration, and the linear acceleration component of interest is typically within a low and predictable frequency range. The frequency of vibration of the double diaphragm suspensions is chosen to be high relative to system bandwidth requirements to permit the filtering extraction of the modulated rate signal from the accelerometer output signal. Angular rate information is obtained, for example, by capacitively coupling the accelerometer output to an amplifier whose passband is centered about the modulation frequency. The output of the amplifier-filter is delivered to the input of the demodulator. The reference signal for the demodulator is chosen to be in phase with the vibration-velocity of the vibrating accelerometer unit. The output of the demodulator is then filtered through a low pass filter to deliver a d.c. voltage proportional in amplitude to the angular rate to be measured with its polarity sensitive to the direction of applied angular rate.

Figure 7:
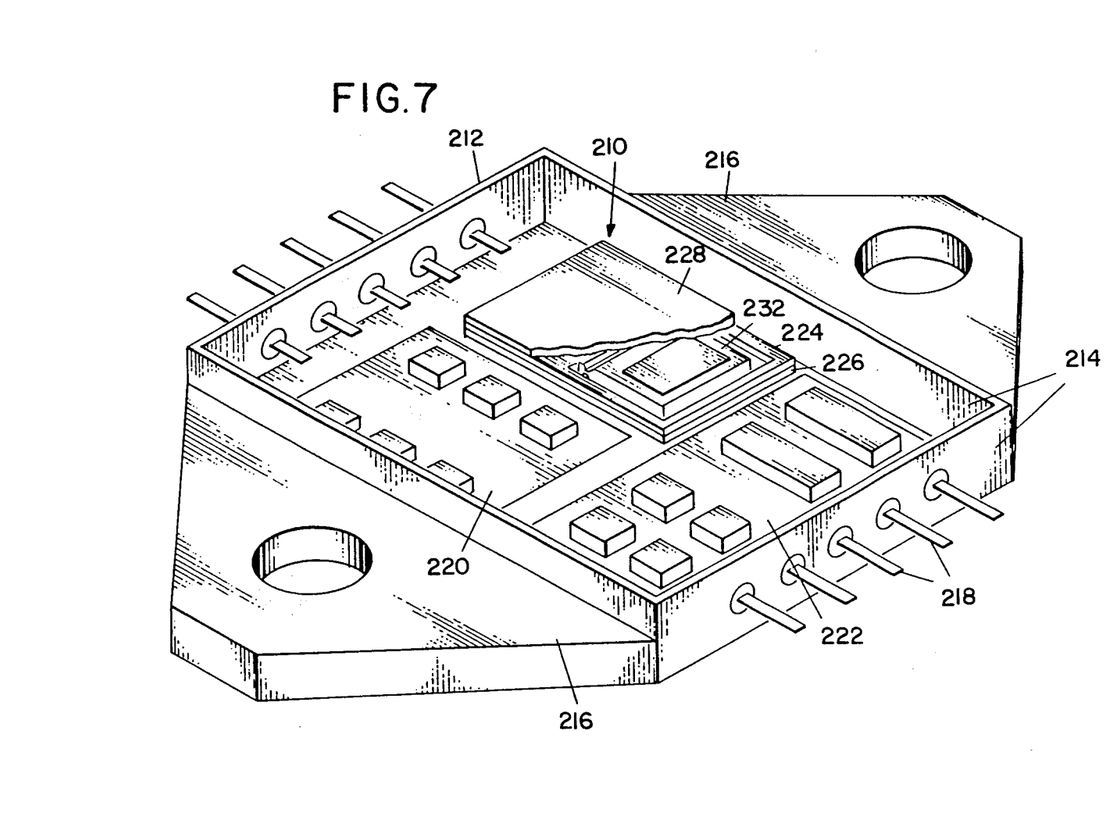
FIG. 7 is a broken perspective view showing a preferred first configuration of an integrated force balanced accelerometer mounted in a typical housing.
Figure 8:
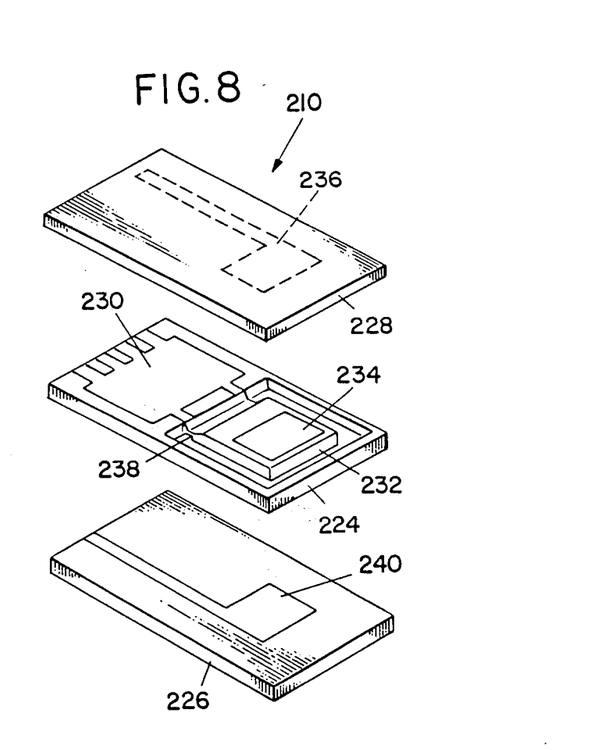
FIG. 8 is an exploded perspective view of a single accelerometer chip for fabricating the preferred accelerometer of FIG. 7 from silicon and pyrex wafers.

FIG. 7 shows, in broken perspective view, an integrated force balanced accelerometer 210 which is a preferred accelerometer for use in the apparatus of this invention.

In the shown embodiment of accelerometer 210, it is shown mounted within a housing 212 which includes four side walls 214 with two mounting tabs 216 extending from two opposed side walls. Electrical contacts 218 are inserted within the two remaining opposed walls for electrical connection with the force balanced accelerometer 210. Separate hybrid circuits form an amplifier 220 and a compensation circuit 222 mounted within the housing 212.

The force balance accelerometer 210, itself, includes a semiconductor substrate 224 that may be fabricated from silicon sandwiched between a pair of non-conductive insulating layers 226 and 228 constructed from pyrex or other suitable dielectric material. The integrated force balanced accelerometer shown may be fabricated by known anisotropic etching techniques. Manufacture of the system is further simplified by its easy adaptations of known integrated circuit fabrication techniques that permit the formation of sensor, sensor drive and data processing electronics, such as an accelerometer restoring amplifier (ARA) 230 onto the surface of the semiconductor substrate 224.

The accelerometer 210 comprises a sensing mass member 232 that senses accelerations normal to the plane of the substrate 224. The sensing mass member 232 includes a first conductive surface 234 that forms a capacitive pickoff in conjunction with a conductive surface 236 formed on the lower surface of the upper insulated substrate 228.

The sensing mass member 232 is cantilevered by a sinple web-like hinge 238. Hinge 238 is typically formed by the anisotropic etching of either side of the semiconductor substrate 224. A like technique may be employed to free the sensing mass member 232 from the substrate 224. Alternate embodiments of the hinge 238 are disclosed in greater detail in FIGS. 9-11. The surface of the substrate 224 may be doped or metalized to form a conductive path between the amplifier 230 and the conductive surface 234. On the opposite surface of the sensing mass member 232, a second conductive surface 234, seen in FIG. 10, is adjacent a conductive surface 240 on the lower, non-conductive substrate 226.

The application of an electrical potential by the ARA 230 to the conductive surface 234 between the conductive surfaces 236 and 240 on insulative layers 228 and 226, respectively, creates a bias field. This field serves to force the sensing mass 22, which includes the conductive surfaces 234, toward a "null" or neutral position. Accelerations of a body fixed to the accelerometer 210 causes the sensing mass member 232 to be displaced physically, unbalancing the capacitance bridge, formed in part by plates 236 and 240 and conductive surfaces 234, to deliver an electrical output signal to ARA 230. The above referenced system is a closed loop feedback control structure whose operation maintains the range of motion of the sensing mass member within an extremely confined physical space.

Figure 9:
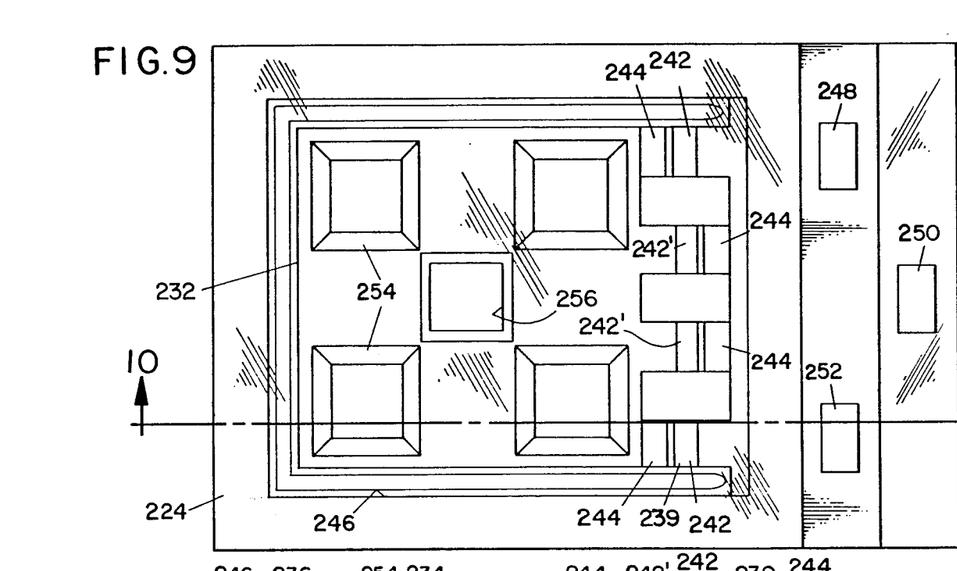
FIG. 9 is a plan view of the inertial mass member and cross beam flexure suspension of the preferred accelerometer of FIG. 7.
Figure 10:
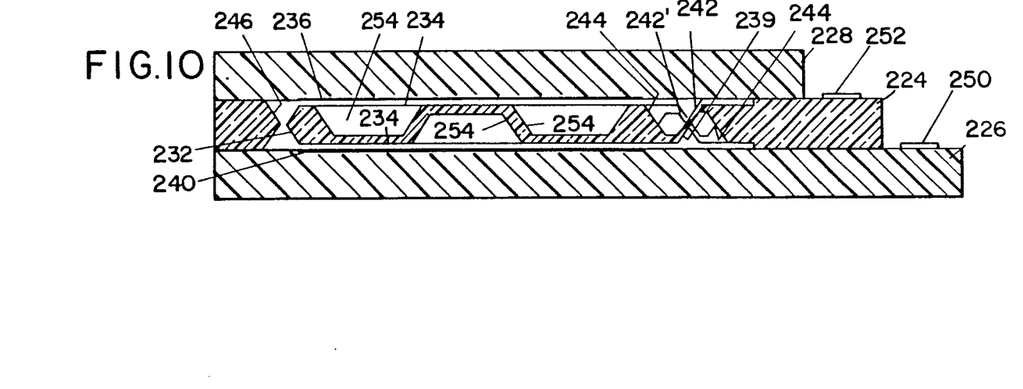
FIG. 10 is a cross-sectional view taken along line 9—9 of FIG. 9.

In FIGS. 9 and 10, a second type of hinge 239 is shown which, in its preferred embodiment, is constructed from crossed beam flexure blades 242. The blades 242 are formed by anisotropic etching of single crystal silicon. The silicon is oriented as a (1,0,0) silicon wafer and masked for etching which forms a V-shaped groove 244 in both upper and lower surfaces of the substrate 224. Referring to the hinge shown along line 24—24 of FIG. 9 in FIG. 10, it will be seen that the upper groove 244 is offset to the left from the lower groove 244. After the anisotropic etchant etches away the silicon, the thin blade 242 that remains between the grooves 244 has a positive slope to the plane of the semiconductive substrate 224. The second flexible blade 242' is formed by a similar set of the V-shaped grooves 244 positioned on opposing surfaces of the substrate 224 to form a blade 242' that is tilted approximately 70 degrees to the first blade 242 and has its center aligned with the center of the first blade. The two blades form crossed beam flexure blades.

In FIG. 9, the flexure blades 242 and 242' comprise two pairs of crossed beam flexure blades 239. While etching the blades, the substrate 224 is masked to etch the periphery 246 of the sensing mass member 232.

Before or after etching, the sensing mass member 232 and flexure blades 242 and 242' are doped with, for example, boron, to make their surfaces conduct. Doping may be extended across the surface of the substrate 224 to a contact pad 248. The doped region etches at a rate significantly slower than the undoped regions, and the depth of the doped material can be used to control the crossed beam flexure blade thickness. These conductive surfaces alternatively may be formed by metalizing techniques similar to the techniques used to place the conductive surfaces 236 and 240 on substrates 228 and 226, respectively. Electrical connections are made between the conductive surfaces 236 and 240 and contact pads 250 and 252 on substrates 226 and 228, respectively.

In a preferred embodiment, to lighten the mass of the sensing mass member 232, excess silicon material is removed from the semiconductor substrate that forms the sensing mass member. One method of removing this material is to etch waffle-like dimples 254 in opposite surfaces of the substrate 224. A center hole 256 is also etched in sensing mass member 232 to balance the capacitance on surfaces 234 and to retain the center of gravity of the sensing mass member at its physical center. Note that the mass of the sensing mass member 232 should be kept small to present as large an area-to-mass ratio as possible.

Figures 11, 12:
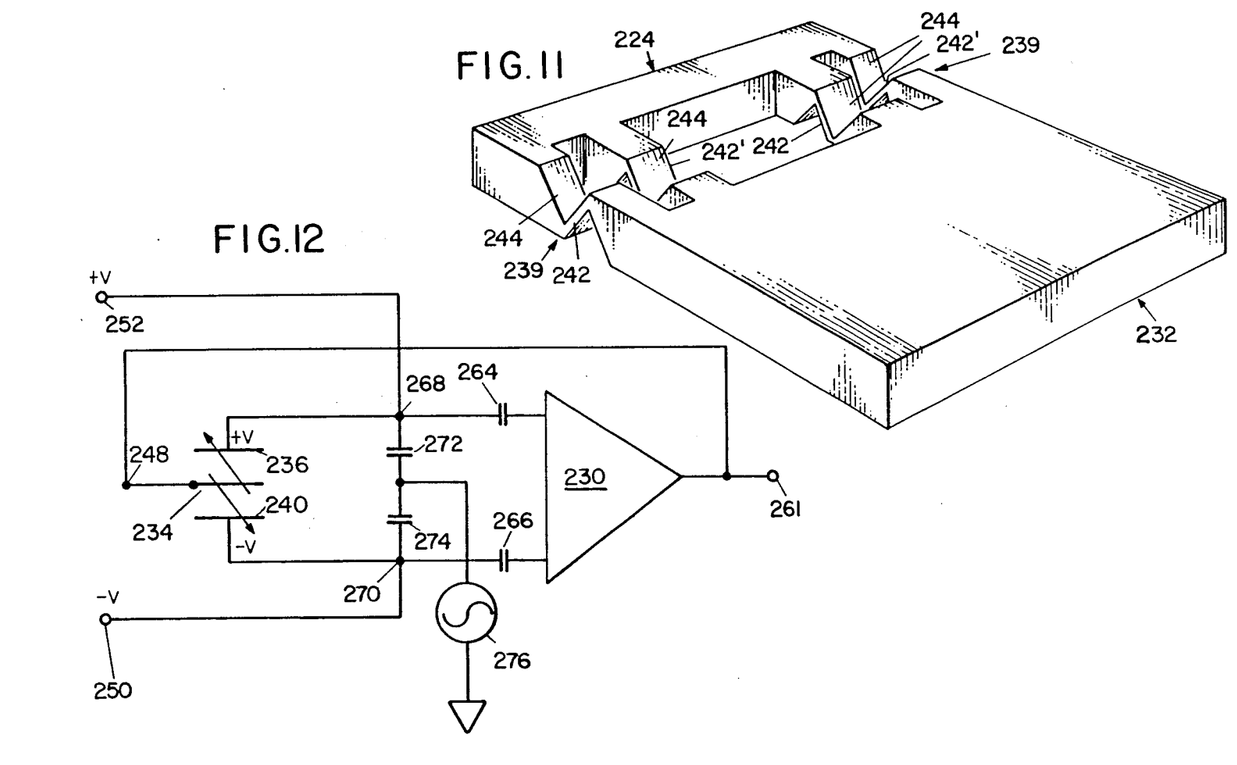
FIG. 11 is a perspective view of the cross beam flexure and cantilevered mounting of the inertial mass member of an embodiment of the preferred accelerometer in a second configuration.
FIG. 12 is a preferred electrical diagram of the integrated force balance accelerometer of FIGS. 7-12.

An illustration of the sensing mass member 232 supported by crossed beam flexure blade hinges 239 from the substrate 224 is shown in FIG. 11. Appropriate etching of the V-shaped grooves 244 produces two pairs of crossed blades 242 and 242' whose centers coincide along a common line that lies in a plane containing the center of gravity and parallel to the plane of the substrate 224.

Further, the hinge arrangement shown in FIG. 11 is different from the orientation shown in FIG. 9 in that the center spacing is larger in FIG. 11. Other variations are possible within the teaching of this specification. The fabrication of the silicon structure can be performed by those specializing in the fabrication of miniature, complexly shaped silicon structures. Among such companies are Transensory Devices, Inc., Fremont, Calif., and Dielectric Semiconductor, Santa Clara, Calif.

In FIG. 12, typical circuitry used with the force balanced accelerometer 210 is shown. The circuit is built around an accelerometer restoring amplifier (ARA) 230 whose output is connected to an output terminal 261 and through a feedback loop to the contact pad 248 which, in turn, connects to the conductive surfaces 234 of sensing mass member 232 disposed between the upper conductive electrode 236 and lower electrode 240. The electrodes 236 and 240 are connected by blocking capacitors 264 and 266 to the input terminals of amplifier 230. The contact pad 252 is connected to a junction 268 and then to the electrode 236. Similarly, the contact pad 250 on the lower substrate 226 connects via a junction 270 to the electrode 240. Connected between junctions 268 and 270 are a pair of capacitors 272 and 274 whose common electrode is connected to a source of alternating power 276, having, for example, a frequency of 50 kilohertz, to form a capacitance pickoff bridge. Terminals 250 and 252 are held at minus 15 volts D.C. and plus 15 volts D.C., respectively.

The apparatus of FIGS. 7-12 is a preferred embodiment for use in the first embodiment apparatus of FIGS. 1-4 and in the second embodiment apparatus of FIGS. 4, 5, and 6.

In operation of the integrated force balance accelerometer of FIGS. 7-12, upward displacement of the sensing mass member 232 causes the A.C. voltage to decrease between fixed electrode 236 and conductive sensing mass member 232 and to increase between electrode 240 and conductive sensing mass member 232. These A. C. voltage changes are delivered to the input of amplifier 230 to generate a feedback signal that is delivered to terminal 248 for further delivery to sensing mass member 232 to return the accelerometer to a balanced or "null" condition. The output signal from amplifier 230, at terminal 261, is also the accelerometer information output signal for delivery to the typical circuit of FIG. 4.

Thus, the invention is a vibrating accelerometer, in both its single and double axis configurations, which preferably uses silicon accelerometers which are made from silicon chips.

Although the invention has been described in detail above, it is not intended that the invention shall be limited to the described invention, but only according to the spirit and scope of the appended claims.

I claim:

1. A multisensor comprising, in combination:
    a first accelerometer, having a sensing first axis, responsive to acceleration along said first sensing axis, to generate a first signal, with a first predetermined polarity, that is a measure of acceleration;
    a second accelerometer, substantially identical to said first accelerometer, having a second sensing axis parallel and substantially collinear to said first axis, and responsive to acceleration along said second sensing axis to generate a second signal, with said first predetermined polarity, that is a measure of acceleration;
    vibrating means for vibrating each of said accelerometers in phase opposition with one another along parallel third and fourth axes, respectively, said third and fourth axes being parallel to each other and orthogonal to said first and second axes;
    a pair of beam suspensions, each having opposed beam support flexures, for mounting said first and second accelerometers with the polarities of their sensing axes in the same direction, said accelerometers facing in the same direction, and constraining said accelerometers to vibrate in purely translational motion along said third and fourth axes;
    summing amplifier means connected to receive said first and second signals, to produce a sum signal; and
    difference amplifier means, connected to receive said first and second signals, to produce a difference signal;
    whereby the output of said summing amplifier means is a measure of acceleration along said first and second axes, and the output of said difference amplifier means is a measure of the Coriolis acceleration induced by angular velocity about a fifth axis perpendicular to said first, second, third and fourth axes.

2. Apparatus as recited in claim 1 in which said third and fourth axes are sufficiently linear and parallel to reduce second and higher order vibratory effects in the output signals of said accelerometers to a magnitude that is negligible compared to the magnitude of the Coriolis component of acceleration to be measured by said accelerometers.

3. Apparatus as recited in claim 2 wherein said means for vibrating vibrates said accelerometers sinusoidally at their mechanically resonant frequencies and at constant sinusoidal velocity amplitudes.

4. Apparatus as recited in claim 3 and further comprising demodulation and filter means connected to receive the output signals of said accelerometers to separate the Coriolis signal components from the linear acceleration signal components of said output signals.

5. Apparatus as recited in claim 4 in which said first and second accelerometers each comprises:
a first planar substrate of semiconductor material having an opening therein that defines the periphery of an acceleration sensitive mass;
said acceleration sensitive mass connected to said semiconductor substrate by a plurality of flexure blades;
second and third planar substrates mounted on opposite sides of said first planar substrate each having a conductive surface adjacent said acceleration sensitive mass;
means for applying an electrical potential between said acceleration sensitive mass and said conductive surfaces on said second and third substrates; and
means formed within said semiconductor material of said first planar substrate to connect said electrical potential to said acceleration sensitive mass.

6. Apparatus as recited in claim 5, in which said flexure blades are crossed flexure blades.

7. Apparatus as claimed in claim 6, wherein:
said means formed within said semiconductor material of each said accelerometer further include electronic means responsive to the output signal of that said accelerometer.

8. Apparatus as claimed in claim 6, wherein:
in each of said accelerometers, said crossed beam flexure blades provide for a cantilevered flexure in one direction and rigidity in all other directions.

9. Apparatus as claimed in claim 6, wherein:
in each of said accelerometers, said crossed beam flexure blades are formed in pairs, each blade formed by two V-shaped grooves in opposite surfaces of said semiconductor substrate which form a blade at an angle to the plane of said substrate, each blade of said pair being at an opposite angle to the other.

10. Apparatus as claimed in claim 6, wherein:
in each of said accelerometers, said acceleration sensitive mass has a waffle-like pattern to create a large surface area-to-mass ratio.

11. Apparatus as recited in claim 6, wherein:
in each of said accelerometers, said second and third substrates are formed of nonconductive material.

12. Apparatus as recited in claim 6, wherein:
in each said accelerometer, said acceleration sensitive mass is formed within said substrate of semiconductor material by doping said material to become conductive; and
said second and third planar substrates are formed by a pair of insulated plates mounted on opposite sides of said semiconductor material and have electrically conductive pads disposed thereon adjacent said acceleration sensitive mass.

13. Apparatus as recited in claim 6, wherein:
in each said accelerometer, said crossed beam flexure blades are formed by anisotropic etching of a single crystal that forms said semiconductor substrate.

14. Apparatus as recited in claim 3 in which said first and second accelerometers each comprise:
a first planar substrate of semiconductor material having an opening therein that defines the periphery of an acceleration sensitive mass;
said acceleration sensitive mass connected to said semiconductor substrate by a plurality of crossed beam flexure blades;
second and third planar substrates mounted on opposite sides of said first planar substrate each having a conductive surface adjacent said acceleration sensitive mass;
means for applying an electrical potential between said acceleration sensitive mass and said conductive surfaces on said second and third substrates, and
means formed within said semiconductor material of said first planar substrate to connect said electrical potential to said acceleration sensitive mass.

15. Apparatus as claimed in claim 14, wherein:
said means formed within said semiconductor material of each said accelerometer further include electronic means responsive to the output signal of that said accelerometer.

16. Apparatus as claimed in claim 14, wherein:
in each of said accelerometers, said crossed beam flexure blades provide for a cantilevered flexure in one direction and rigidity in all other directions.

17. Apparatus as claimed in claim 14, wherein:
in each of said accelerometers, said crossed beam flexure blades are formed in pairs, each blade formed by two V-shaped grooves in opposite surfaces of said semiconductor substrate which form a blade at an angle to the plane of said substrate, each blade of said pair being at an opposite angle to the other.

18. Apparatus as claimed in claim 14, wherein:
in each of said accelerometers, said acceleration sensitive mass has a waffle-like pattern to create a large surface area-to-mass ratio.

19. Apparatus as recited in claim 14, wherein:
in each of said accelerometers, said second and third substrates are formed of nonconductive material.

20. Apparatus as recited in claim 14, wherein:
in each said accelerometer, said acceleration sensitive mass is formed within said substrate of semiconductor material by doping said material to become conductive; and
said second and third planar substrates are formed by a pair of insulated plates mounted on opposite sides of said semiconductor material and have electrically conductive pads disposed thereon adjacent said acceleration sensitive mass.

21. Apparatus as recited in claim 14, wherein:
in each said accelerometer, said crossed beam flexure blades are formed by anisotropic etching of a single crystal that forms said semiconductor substrate.

22. A multisensor as defined in claim 21 wherein said vibrating means comprises a plurality of piezoelectric elements.

* * * * *